United States Patent
Hartkopp et al.

(10) Patent No.: US 11,128,650 B2
(45) Date of Patent: Sep. 21, 2021

(54) DETECTION OF MANIPULATIONS IN A CAN NETWORK BY CHECKING CAN IDENTIFIERS

(71) Applicant: VOLKSWAGEN AKTIENGESELLSCHAFT, Wolfsburg (DE)

(72) Inventors: Oliver Hartkopp, Wolfsburg (DE); André Oberschachtsiek, Braunschweig (DE)

(73) Assignee: VOLKSWAGEN AKTIENGESELLSCHAFT

( * ) Notice: Subject to any disclaimer, the term of this patent is extended or adjusted under 35 U.S.C. 154(b) by 208 days.

(21) Appl. No.: 16/344,057

(22) PCT Filed: Sep. 12, 2017

(86) PCT No.: PCT/EP2017/072916
§ 371 (c)(1),
(2) Date: Apr. 23, 2019

(87) PCT Pub. No.: WO2018/077528
PCT Pub. Date: May 3, 2018

(65) Prior Publication Data
US 2020/0067956 A1    Feb. 27, 2020

(30) Foreign Application Priority Data
Oct. 25, 2016 (DE) .................... 10 2016 220 895.0

(51) Int. Cl.
*H04L 29/06* (2006.01)
*G06F 11/34* (2006.01)
(Continued)

(52) U.S. Cl.
CPC ........ *H04L 63/1425* (2013.01); *G06F 11/349* (2013.01); *G06F 21/55* (2013.01);
(Continued)

(58) Field of Classification Search
CPC ........... H04L 63/1425; H04L 12/40013; H04L 63/126; H04L 63/1466; H04L 67/12;
(Continued)

(56) References Cited

U.S. PATENT DOCUMENTS 6,944,739 B2 * 9/2005 Bartling .................... G11C 8/12
710/29
8,949,823 B2    2/2015 Ricci
(Continued)

FOREIGN PATENT DOCUMENTS

CN    106027260 A    10/2016
DE    102010028616 A1    12/2010
(Continued)

OTHER PUBLICATIONS

English Translation of JP-2015192216-A (Year: 2015).*
(Continued)

*Primary Examiner* — Daniel B Potratz
*Assistant Examiner* — Wansik You
(74) *Attorney, Agent, or Firm* — Barnes & Thornburg LLP

(57) ABSTRACT

By extending a Basic-CAN controller and/or a Full-CAN controller with a RX filter device, it is possible to compare the CAN identifiers intended for transmission for the CAN controller with those of the received CAN frames. In the case of a match, an interrupt is generated. When no hardware expansion is intended, the RX-FIFO or TX-FIFO of a Full-CAN controller is used for detecting an intrusion.

6 Claims, 6 Drawing Sheets

(51) Int. Cl.
  *G06F 21/55* (2013.01)
  *G07C 5/00* (2006.01)
  *G07C 5/08* (2006.01)
  *H04L 12/40* (2006.01)
  *H04L 29/08* (2006.01)

(52) U.S. Cl.
  CPC ............ *G07C 5/008* (2013.01); *G07C 5/085* (2013.01); *H04L 12/40013* (2013.01); *H04L 63/126* (2013.01); *H04L 63/1466* (2013.01); *H04L 67/12* (2013.01); *H04L 2012/40215* (2013.01); *H04L 2012/40273* (2013.01)

(58) Field of Classification Search
  CPC . H04L 2012/40215; H04L 2012/40273; G06F 11/349; G06F 21/55; G07C 5/008; G07C 5/085
  See application file for complete search history.

(56) References Cited

U.S. PATENT DOCUMENTS

| | | | |
|---|---|---|---|
| 2004/0001499 A1* | 1/2004 | Patella | ...................... H04B 3/54 370/412 |
| 2011/0007759 A1* | 1/2011 | Dawson | ................ H04L 12/413 370/498 |
| 2014/0337976 A1 | 11/2014 | Moeller et al. | |
| 2015/0113638 A1 | 4/2015 | Valasek et al. | |

FOREIGN PATENT DOCUMENTS

| | | | |
|---|---|---|---|
| DE | 102013200525 A1 | | 7/2014 |
| DE | 102013200535 A1 | | 7/2014 |
| JP | 2015192216 A | * | 11/2015 |
| JP | 2015192216 A | | 11/2015 |

OTHER PUBLICATIONS

Philips; Data Sheet; SJA1000; Stand-alone CAN controller; Jan. 4, 2000.

Siemens; Data Sheet; SAE841C90/91; Microcomputer Components; Standalone Full-CAN Controller; Sep. 23, 2004.

Search Report for International Patent Application No. PCT/EP2017/072916; dated Dec. 12, 2017.

Office Action for Chinese Patent Application No. 201780066377.9; dated Jan. 6, 2021.

* cited by examiner

DETECTION OF MANIPULATIONS IN A CAN NETWORK BY CHECKING CAN IDENTIFIERS

PRIORITY CLAIM

This patent application is a U.S. National Phase of International Patent Application No. PCT/EP2017/072916, filed 12 Sep. 2017, which claims priority to German Patent Application No. 10 2016 220 895.0, filed 25 Oct. 2016, the disclosures of which are incorporated herein by reference in their entireties.

SUMMARY

Illustrative embodiments relate to a basic CAN controller and to a full CAN controller for detecting manipulation in a CAN network and to the use of a full CAN controller.

BRIEF DESCRIPTION OF THE DRAWINGS

Disclosed embodiments are explained below on the basis of the drawings, in which.

DETAILED DESCRIPTION

Figure 1:
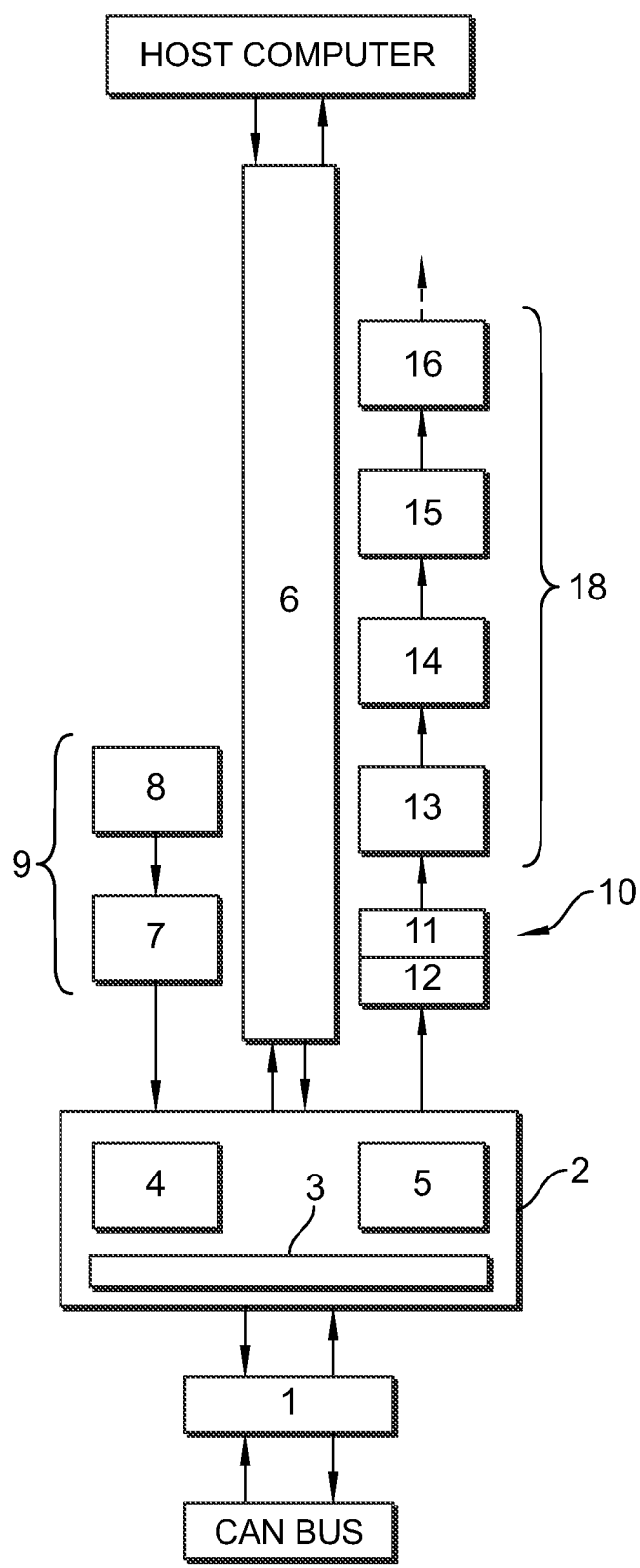
FIG. 1 shows a basic CAN controller according to the prior art.

The deliberate manipulation of contents in CAN networks in the transportation vehicle, for which the term "hacking" is usually used, is an intensive point of discussion in connection with cybersecurity for transportation vehicles. The Society of Automotive Engineers, SAE for short, already has a Vehicle Cybersecurity Working Group which monitors the current developments in manipulations of transportation vehicle electronics and searches for possibilities for preventing them.

In principle, manipulation on a CAN bus can be detected in two ways: host-based intrusion detection, that is to say the control device itself detects the attack, or network-based intrusion detection, that is to say a monitoring entity detects the attack.

Since the CAN bus uses a multi-master communication method, the addressing using the so-called CAN identifiers is specified in such a manner that control devices can transmit only to particular addresses, that is to say CAN identifiers, which ensures the multi-master arbitration method.

In the event of an attack, the attacker generally transmits CAN messages, the CAN identifiers of which have already been allocated at the transmission end to control devices to manipulate the receivers of the additional transmitted contents with an identical CAN identifier.

The originally transmitting control device can therefore detect an attack by receiving CAN identifiers which actually should have been transmitted only by the control device itself. This host-based method is known and is also described in the literature.

In this case, CAN networks are formed by networking control devices, so-called CAN controllers, using a CAN bus, wherein a distinction can fundamentally be made between two CAN controller architectures:

Basic CAN: the basic CAN controller has simple filtering with typically one filter for receiving CAN messages, so-called CAN frames, and little storage space for CAN messages. This results in a high CPU load since the filtering is primarily carried out by software. Furthermore, the hardware complexity is low relative to the costs.

Full CAN: the full CAN controller comprises a plurality of message filters with associated storage space for CAN messages, which results in a lower CPU load since the filtering is primarily carried out by the hardware. Furthermore, the ratio of hardware complexity to costs is greater.

The reception of CAN identifiers which can be transmitted only by the CAN node itself can only be monitored according to the prior art by configuring receiving filters in the CAN controller for the corresponding CAN identifiers. The quantity of receiving filters in a CAN controller is greatly limited, for example, to 4, 8, 16 or 32 filters. These filters deduce the number of interrupts of the control device processor and are usually required to receive application data from other CAN subscribers.

The practice of using these few (receiving) filters to monitor separate (transmission) identifiers cannot be implemented or can be only incompletely implemented on account of the limitations on the quantity. In addition, the control device must process received application messages differently from received transmission messages in the event of an attack.

If the quantity of receiving filters does not suffice to monitor the separate transmission identifiers, it is also possible to define a filter which simultaneously reacts to many CAN identifiers. This results in the number of interrupts increasing relatively sharply, which results in an additional load on the processor of the control device.

On account of these restrictions of the CAN controllers, the detection method which is useful per se is currently implemented, in principle, only rarely in transportation vehicle control devices.

The document DE 10 2013 200 525 A1 thus relates to a method and an apparatus for operating a communication network, in particular, of a transportation vehicle, wherein at least two control devices are connected to one another by data-technological means via the communication network. Provision is made for the data traffic in the communication network to be captured, for the captured data traffic to be compared with previously captured data relating to the data traffic and for possible data manipulation to be detected as the result of the comparison. If data manipulation is detected, at least one switch-off signal is transmitted to at least one control device and the at least one control device receiving a switch-off signal is transferred to a secure operating state.

Furthermore, the document DE 10 2013 200 535 A1 relates to a method and an apparatus for operating a communication network of a transportation vehicle, wherein at least two control devices are coupled to the communication network. Provision is made for data or messages transmitted from a first control device to a second control device to be transmitted via at least two communication paths of the communication network and for the data or messages arriving at the second control device via the at least two communication paths to be checked for possible data manipulation on the basis of a plausibility check.

The document US 20140337976 A1 relates to a method for operating a mobile router installed in a transportation vehicle. In this case, the transportation vehicle comprises a network, such as, a bus which is connected to a multiplicity of electronic control devices. The mobile router also comprises an interface for a wireless wide area network (WWAN), an interface for a wireless local area network (WLAN), an interface to a network bus of a transportation vehicle, a processor and a memory having a multiplicity of programs. The multiplicity of programs comprise an intrusion detection program which can be executed by the processor. The method for operating the mobile router comprises monitoring the data on the network bus, detecting one or more anomalies in the monitored data by the intrusion detection program and generating a warning after one or more anomalies have been detected.

The disclosed embodiments provide a method and an apparatus which can be used to easily and securely detect manipulation in a CAN network or on a CAN bus.

Disclosed embodiments provide a basic CAN controller, a full CAN controller, and the use of a full CAN controller.

The disclosed basic CAN controller for detecting manipulation in a CAN network comprises:
  a CAN transceiver for connecting the basic CAN controller to a CAN bus,
  a CAN protocol engine for coding a CAN frame into a bitstream to be transmitted for transmission on the CAN bus and for decoding a received bitstream from the CAN bus into a CAN frame,
  a TX-FIFO for storing CAN frames to be transmitted,
  an RX-FIFO for temporarily storing the received CAN frames before transmission to the host computer, wherein a filter element is arranged upstream of the RX-FIFO and filters the CAN frames intended for the basic CAN controller and forwards permissible CAN frames to the RX-FIFO, and
  a host control interface for communicating control information between the CAN protocol engine and a host computer, wherein
  the basic CAN controller has an RX filter device which, on the basis of the CAN identifiers which are assigned to the basic CAN controller for transmitting CAN frames and are specific to the basic CAN controller, checks whether a received CAN frame has a CAN identifier which is identical to one of the CAN identifiers specific to the basic CAN controller and, in the event of correspondence, triggers an intrusion detection interrupt IDS-IRQ to the host control interface.

The disclosed full CAN controller for detecting manipulation in a CAN network comprises
  a CAN transceiver for connecting the full CAN controller to a CAN bus,
  a CAN protocol engine for coding a CAN frame into a bitstream to be transmitted for transmission on the CAN bus and for decoding a received bitstream from the CAN bus into a CAN frame,
  a TX-FIFO for storing CAN frames to be transmitted,
  a priority selector for transmitting a CAN frame to be transmitted to the CAN protocol engine as a function of the priority,
  an RX-FIFO for temporarily storing the received CAN frames before transmission to the host computer, wherein the RX-FIFO has a multiplicity of CAN filter storage elements, and each CAN filter storage element has a filter element for filtering permissible CAN frames intended for the full CAN controller from the received CAN frames and for storing a permissible CAN frame in a CAN frame storage element, and
  a host control interface for communicating control information between the CAN protocol engine and a host computer, wherein
  the full CAN controller has an RX filter device which, on the basis of the CAN identifiers which are assigned to the full CAN controller for transmitting CAN frames and are specific to the full CAN controller, checks whether a received CAN frame has a CAN identifier which is identical to one of the CAN identifiers specific to the full CAN controller and, in the event of correspondence, triggers an intrusion detection interrupt IDS-IRQ to the host control interface.

The RX filter device may have a filter bank comprising one or more filter elements, wherein the filter elements check a received CAN frame to determine whether its CAN identifier corresponds to one of the CAN identifiers which are specific to the CAN controller and are intended for transmission, and a storage element for storing a received CAN frame, the CAN identifier of which corresponds to a CAN identifier specific to the CAN controller.

In the disclosed use of a full CAN controller for detecting manipulations in a CAN network, wherein the full CAN controller has
  a CAN transceiver for connecting the full CAN controller to a CAN bus,
  a CAN protocol engine for coding a CAN frame into a bitstream to be transmitted for transmission on the CAN bus and for decoding a received bitstream from the CAN bus into a CAN frame,
  a TX-FIFO for storing CAN frames to be transmitted,
  a priority selector for transmitting a CAN frame to be transmitted to the CAN protocol engine as a function of the priority,
  an RX-FIFO for temporarily storing the received CAN frames before transmission to the host computer, wherein the RX-FIFO has a multiplicity of CAN filter storage elements, and each CAN filter storage element has a filter element for filtering permissible CAN frames intended for the full CAN controller from the received CAN frames and for storing a permissible CAN frame in a CAN frame storage element, and
  a host control interface for communicating control information between the CAN protocol engine and a host computer,
  the filter elements of a subset of the CAN filter storage elements of the RX-FIFO are occupied by the CAN identifiers specific to the full CAN controller for transmitting a CAN frame, with the result that the CAN identifiers of the received CAN frames are checked with the CAN identifiers specific to the full CAN controller in the respective filter elements. If a received CAN identifier corresponds to one of the specific CAN identifiers of the full CAN controller, the received CAN identifier is stored in the corresponding CAN frame storage element and an intrusion detection interrupt IDS-IRQ to the host control interface is generated.

In a further disclosed use of a full CAN controller for detecting manipulations in a CAN network, wherein the full CAN controller has
  a CAN transceiver for connecting the full CAN controller to a CAN bus,
  a CAN protocol engine for coding a CAN frame into a bitstream to be transmitted for transmission on the CAN bus and for decoding a received bitstream from the CAN bus into a CAN frame, a TX-FIFO having a multiplicity of CAN frame storage elements for storing CAN frames to be transmitted, a priority selector for transmitting a CAN frame to be transmitted to the CAN protocol engine as a function of the priority, an RX-FIFO for temporarily storing the received CAN frames before transmission to the host computer, wherein the RX-FIFO has a multiplicity of CAN filter storage elements, and each CAN filter storage element has a filter element for filtering permissible CAN frames intended for the full CAN controller from the received CAN frames and for storing a permissible CAN frame in a CAN frame storage element, and a host control interface for communicating control information between the CAN protocol engine and a host computer, received CAN frames are supplied to the CAN frame storage elements of the TX-FIFO at the reception time and are compared for correspondence between the CAN identifier of the received CAN frame and the CAN identifiers which are present in the CAN frame storage elements and are intended for transmission, and, in the event of correspondence, an intrusion detection interrupt IDS-IRQ to the host control interface is generated.

In summary, the practice of expanding a basic CAN controller or a full CAN controller with an RX filter device makes it possible to compare the CAN identifiers intended for the CAN controller for transmission with those of the received CAN frames and to generate an interrupt if correspondence is found since an attack is present in this case. However, the additional RX filter device expands the hardware of the CAN controller, in which case both the existing TX-FIFO and the RX-FIFO do not assume any function for the intrusion detection.

If hardware expansion is not intended, the RX-FIFO or the TX-FIFO of a full CAN controller can be used to detect an intrusion.

The intrusion detection interrupt IDS-IRQ which reports the detection of an intrusion to the host control interface may be a separate line. The intrusion detection interrupt IDS-IRQ may be an additional interrupt source in the interrupt control register of the CAN controller, in which other interrupt sources, for example, TX, RX, error, overflow interrupts, can also be configured.

FIG. 1 shows a schematic illustration of a known basic CAN controller with its essential elements, as is implemented, for example, in the basic CAN controller SJA1000 from NXP. Since the English term of the individual elements has prevailed in the field of CAN buses, it is retained in the following description. The connection to the two-wire CAN bus (not illustrated) is effected via a CAN transceiver 1 which taps off the coded signals from the bus or places them onto the bus. The CAN transceiver 1 is in turn connected to a CAN protocol engine 2 which decodes the received bitstream or codes the bitstream to be transmitted according to the CAN protocol. For this purpose, the CAN protocol engine 2 comprises a bitstream encoder 4 and a bitstream decoder 5, wherein a control logic unit 3 monitors and controls operation.

A CAN message, which is also referred to as a CAN frame here, comprises a preceding CAN identifier which has a length of 11 bits in the standard frame format and a length of 28 bits in the extended frame format and is followed by useful data, for example, 8 bytes, apart from in the case of an RTR (Remote Transmission Request) frame. In this case, a CAN identifier, which is also identified as an object, indicates the content of the CAN frame and not the address of the device. For example, a separate identifier may be respectively allocated to the parameters of temperature, voltage and pressure in a measuring system. A plurality of parameters can be combined under one CAN identifier as long as the sum of the data does not exceed the maximum possible length of the useful data field, that is to say 8 bytes in the example here or a maximum of 64 bytes in the case of CAN FD. The receivers decide, on the basis of the CAN identifier, whether or not the message is relevant to them. In addition, the CAN identifier is also used to prioritize the CAN messages or CAN frames. The "value" of the CAN identifier is referred to as the ID value.

The basic CAN controller illustrated in FIG. 1 comprises a filter 10, as a result of which it is possible to filter, that is to say accept or sort out, received CAN frames. To be able to carry out filtering, the filter 10 has an ID mask 11 which logically combines the CAN identifier 12 and the received CAN identifier using an AND function. A received CAN frame is therefore accepted by the filter 10 if:

(received CAN ID AND ID mask 11) is equal to (ID value 12 AND ID mask 11).

If the filter 10 has accepted a CAN frame, the latter is shifted into a receiving storage area which is referred to as RX-FIFO 18, in which case RX stands for "Receive". In the example in FIG. 1, the RX-FIFO 18 comprises four storage areas 13, 14, 15 and 16, each of which can store a CAN frame which comprises the respective CAN identifier, flags and data. The stored CAN frame is also possibly provided with a date, that is to say a time stamp. In the simplest expansion stage, the RX-FIFO 18 comprises only one storage area 13, which inevitably results in an interrupt having to be transmitted to the host computer if a filtered and therefore permissible CAN frame is received and stored via the host control interface 6, so that the CAN frame stored in the storage area 13 is accepted by the host computer before a next permissible CAN frame arrives. If the host computer is therefore overloaded and cannot retrieve the current CAN message from the storage area 13 despite receiving an interrupt from the host control interface 6, the current stored CAN message is possibly overwritten by the next permissible CAN message. This possibility of overwriting is reduced by using an accordingly large RX-FIFO 18 having a plurality of storage areas 13, 14, 15, 16.

The transmission storage area, which is referred to as the TX-FIFO 9 and shows the FIFO memory for the CAN frames to be output, is illustrated on the left-hand side of FIG. 1. In this case, the TX-FIFO 9, in which case TX stands for "Transmit", comprises two storage areas 7, 8 for temporarily storing the CAN frames to be transmitted having a CAN identifier, flags and data.

Figure 2:
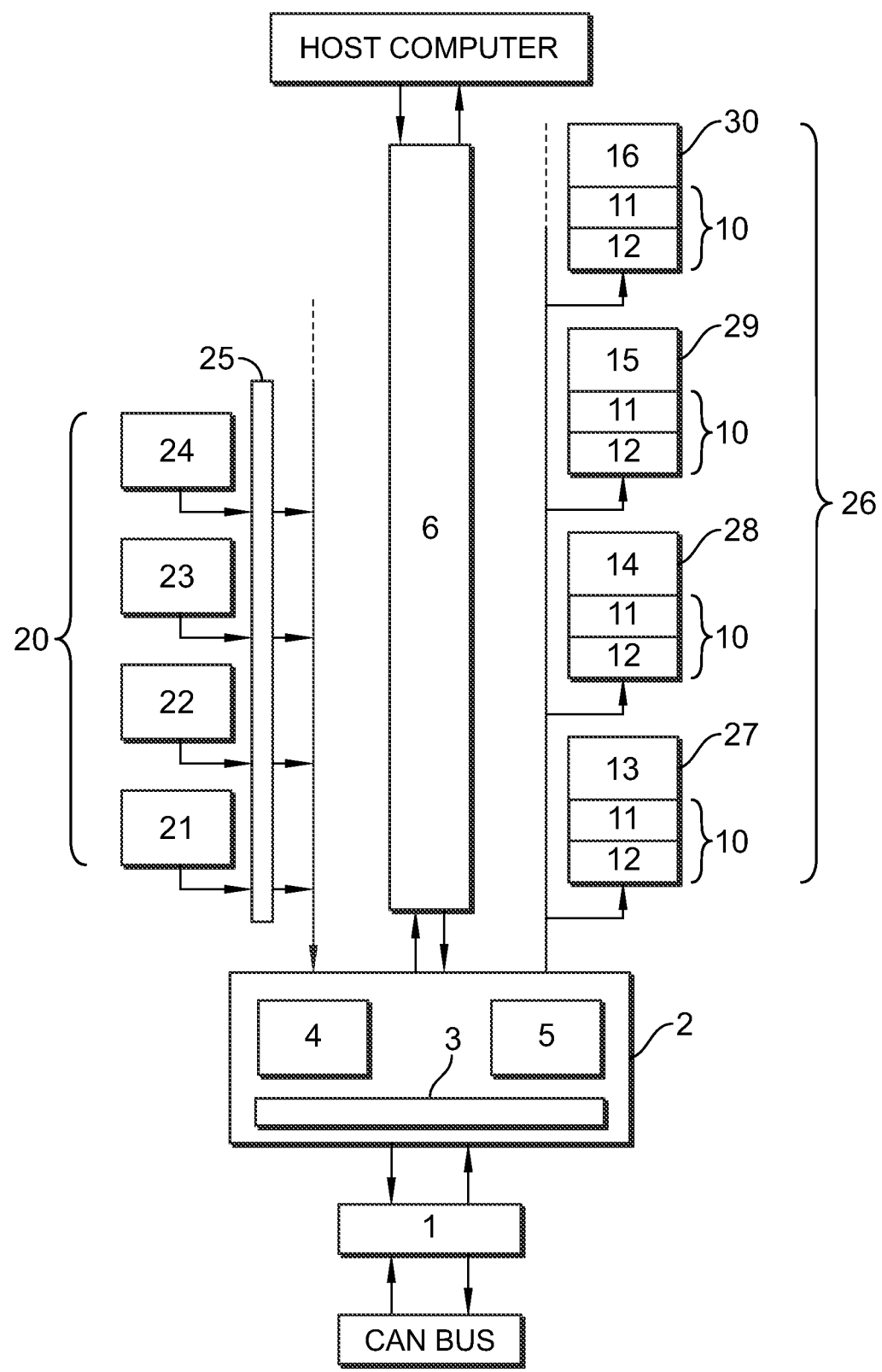
FIG. 2 shows a full CAN controller according to the prior art.

FIG. 2 shows a full CAN controller according to the prior art, as is implemented, for example, in the above-mentioned full CAN controller 82C900 from Infineon, in which case identical reference signs conventionally denote identical components.

Like in the basic CAN controller, the connection to the two-wire CAN bus is effected via the CAN transceiver 1 which taps off the coded signals from the bus or places the coded signals onto the bus. The CAN transceiver 1 receives the bitstream or sends the received bitstream to the CAN protocol engine 2 which decodes the received bitstream or codes the bitstream to be transmitted according to the CAN protocol. For this purpose, the CAN protocol engine 2 has a bitstream encoder 4 and a bitstream decoder 5, wherein a control logic unit 3 monitors and controls operation of the CAN protocol engine 2. The CAN protocol engine 2 is also connected to a host control interface 6 which establishes the connection to a host computer to indicate the receipt of a CAN frame to the host computer, for example, by generating an interrupt.

In the full CAN controller, a received CAN frame is supplied to an RX message buffer 26 which has a predefined number of filter storage elements 27, 28, 29 and 30. Four filter storage elements 27, 28, 29, 30 are indicated in FIG. 2, but the number of filter storage elements 27, 28, 29, 30 should be understood merely as an example and can be adapted to the requirements imposed on the CAN controller.

Each filter storage element 27, 28, 29, 30 of the RX message buffer 26 comprises a filter 10, consisting of the link between the ID value 11 of the CAN identifier and the ID mask 12, and a downstream storage area 13, 14, 15, 16 in which the filtered CAN frame having the ID value, flags, data and a time stamp is stored and is available for retrieval by the host computer. Although it is possible to use a plurality of mutually independent ID masks as a result of the use of a plurality of filters 10 in the respective filter storage element 27, 28, 29, 30, the provision of the received CAN frames to the host computer is time-critical and an interrupt must be processed within the time within which a filter storage element 27, 28, 29, 30 could be overwritten with a next permissible CAN frame. If, for example, the first filter storage element 27 is occupied by a permissible CAN frame, which means that an incoming CAN frame has an ID value matching the ID mask 11, the host computer is informed, by an interrupt, that a CAN frame is due for retrieval. If the interrupt is now not processed quickly enough within a predefined period which is predefined by a measuring cycle, for example, a next CAN frame having an ID value 12 matching the ID mask 11 may be present at the special filter storage element 27 for storage within the predefined period, as a result of which the stored previous CAN frame is overwritten and is therefore lost.

The transmission side of the full CAN controller in FIG. 2 comprises a TX transmission buffer 20 having a plurality of CAN frame storage areas 21, 22, 23 and 24 in which CAN frames can be stored by the host computer for transmission. A priority selector 25 is arranged downstream of the TX transmission buffer 20 and may transmit CAN frames with a higher priority. In this case, the priority is stipulated using the ID value. The CAN frame intended for transmission by the priority selector 25 is then placed onto the CAN bus by the CAN protocol engine 2 via the CAN transceiver 1.

Figure 3:
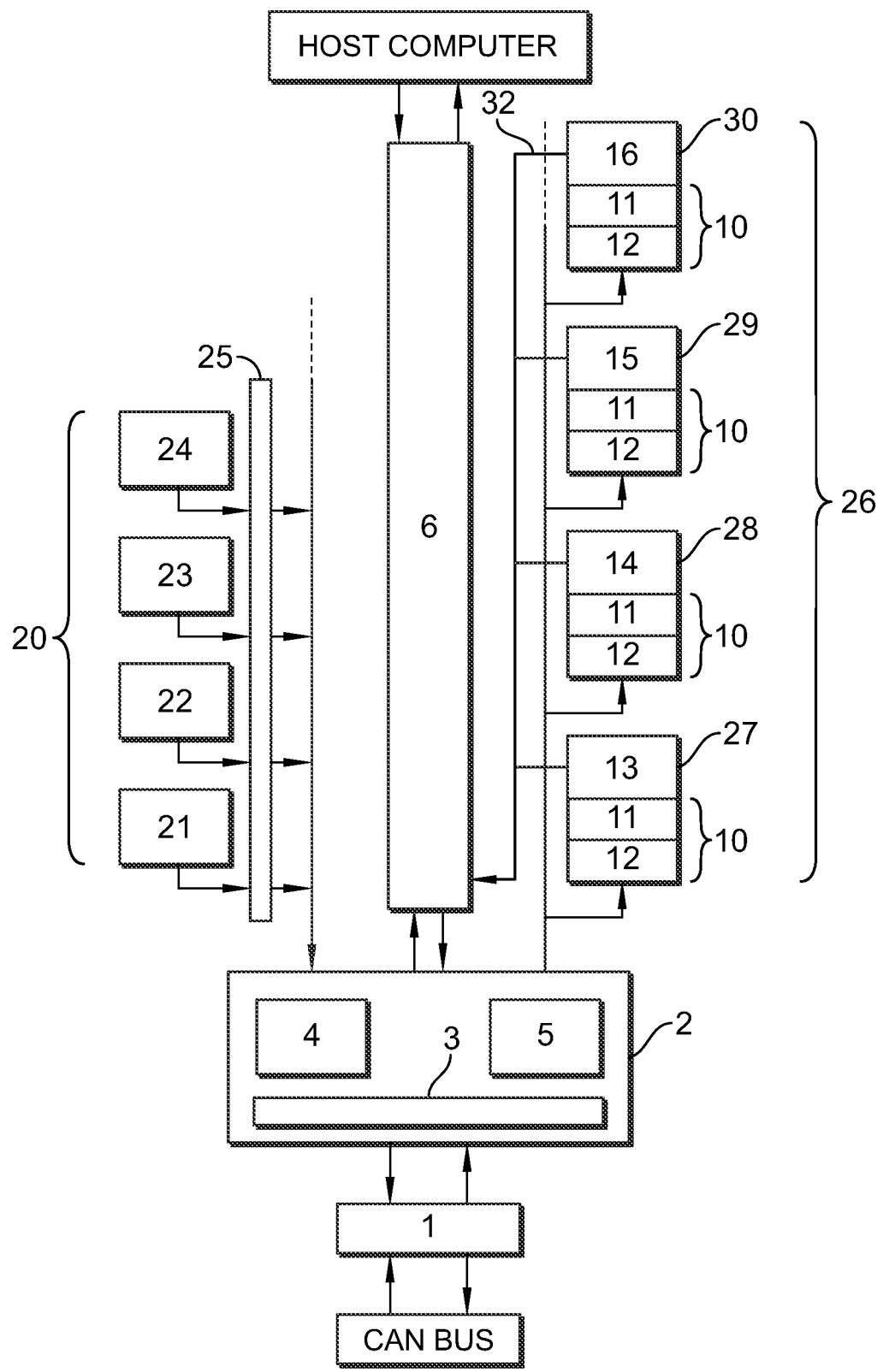
FIG. 3 shows a full CAN controller having a first embodiment of intrusion detection.

FIG. 3 shows a full CAN controller corresponding to that in FIG. 2, in which a first facet of intrusion detection is implemented. Identical reference signs of the full CAN controllers in FIGS. 2 and 3 denote identical elements, with the result that reference is made to FIG. 2 for the description of their functionality. In summary, the CAN controller in FIG. 3 comprises a CAN transceiver 1 for connection to the CAN bus, a CAN protocol engine 2 for coding and decoding the data received from the CAN transceiver, a host control interface 6 for connecting the full CAN controller to a host computer, an RX message buffer 26 for temporarily storing CAN frames intended for this CAN controller, and a TX message buffer for temporarily storing CAN frames to be transmitted.

As already mentioned, each CAN controller is assigned a number of CAN identifiers for transmitting CAN frames which are permissible and can be used. If a CAN controller therefore receives a CAN frame with an associated CAN identifier, the CAN controller or the corresponding host computer can determine, on the basis of the CAN identifier, whether or not this CAN frame constitutes an attack. If the CAN frame is detected as an attack since use was made of a CAN identifier which is actually assigned to the receiving CAN controller for transmission, a corresponding response by the CAN controller can be effected, for example, by rendering this impermissible CAN frame harmless to other reading CAN controllers in the network using a corresponding error frame.

To be able to detect an intrusion, that is to say an attack, a number of CAN filter storage elements 27, 28, 29 and 30 are therefore configured in such a manner that the separate CAN identifiers which are allocated to the CAN controller and are used for transmission are stored in the respective ID mask areas 11. If a CAN filter storage element 27, 28, 29, 30 now accepts a CAN frame having a CAN identifier specific to the CAN controller on account of positive filtering by the corresponding filter element 10, an intrusion interrupt request, a so-called IDS-IRQ 32, is triggered and is transmitted, by the host control interface 6, to the host computer which then transmits a corresponding error frame, for example.

However, the number of CAN frames having permissible CAN identifiers which are intended for reception for the CAN controller is reduced by using some of the CAN filter storage elements as detectors for CAN frames having the separate specific CAN identifiers.

Figure 4:
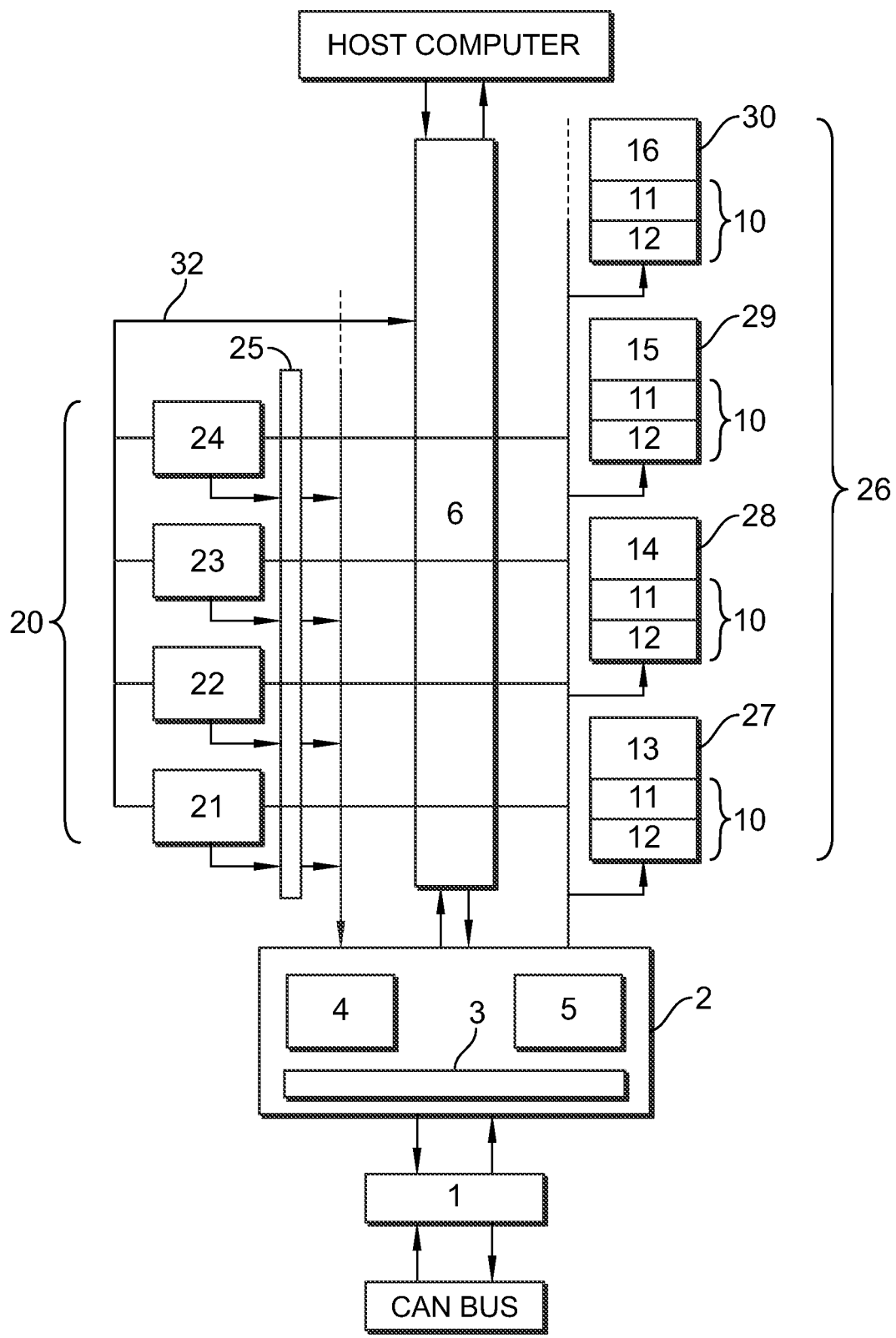
FIG. 4 shows a full CAN controller having a second embodiment of intrusion detection.

FIG. 4 shows a full CAN controller corresponding to that in FIG. 2, in which a second facet of intrusion detection is implemented. Like in the example of the full CAN controller in FIG. 3, an attack is detected by examining the CAN identifier of a received CAN frame. In the full CAN controller in FIG. 4, the received CAN frames are checked using the CAN frame storage elements 21, 22, 23, 24 of the TX message buffer 20. For this purpose, the received CAN frames are tapped off downstream of the bitstream decoder 5 of the CAN protocol engine 2 parallel to the RX message buffer 26 and are supplied to the CAN frame storage elements 21, 22, 23, 24 of the TX message buffer 20. In the CAN frame storage elements 21, 22, 23, 24, the CAN identifier of a received CAN frame is checked at the reception time and an IDS-IRQ 32 is generated and is supplied to the host computer if the received CAN identifier corresponds to an identifier which is reserved for and is therefore specific to the full CAN controller. As a result, the full CAN controller can generate a corresponding error frame and can place it onto the CAN bus, thus rendering the attack harmless.

Figure 5:
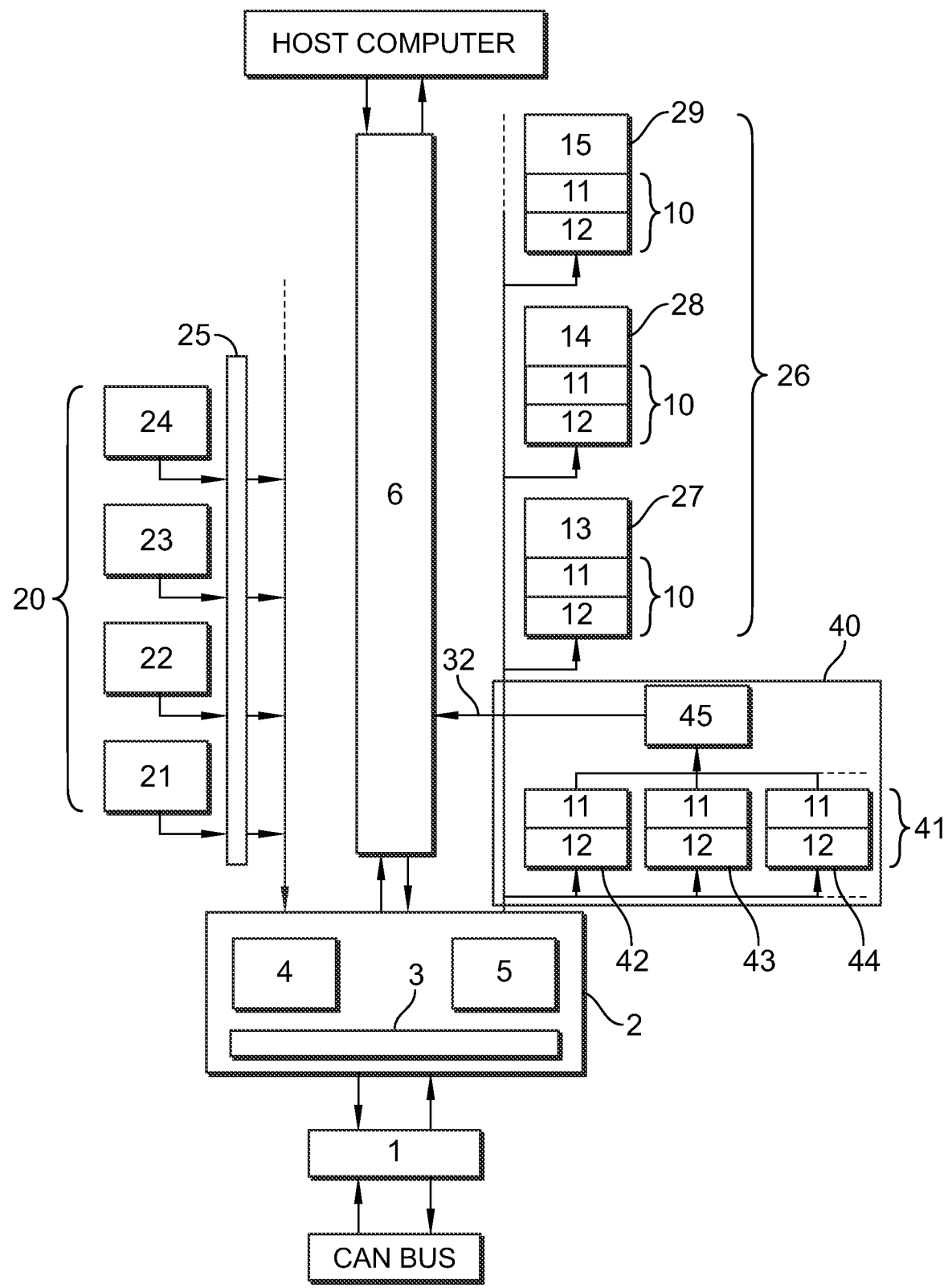
FIG. 5 shows a full CAN controller having a filter device for intrusion detection.

FIG. 5 shows a full CAN controller corresponding to that in FIG. 2, in which intrusion detection is implemented by a separate RX filter device 40 which taps off the received CAN frames immediately downstream of the CAN protocol engine 2, that is to say immediately after reception. In this case, the RX filter device comprises a filter bank 41 comprising a plurality of filter elements 42, 43, 44, wherein the number of three filter elements 42, 43, 44 illustrated here should be understood merely as symbolic and the number of filter elements 42, 43, 44 is usually greater than three. In this case, a filter element 42, 43, 44 is formed from an ID mask 11 and an ID identifier value 12. In this case, the CAN identifiers of the CAN frames to be monitored are introduced into the ID identifier values 12 of the filter elements 42, 43, 44. Since filtering is usually intended to be carried out on precisely one CAN identifier in a filter element 42, 43, 44, a value to which all bits of the filter are set is entered in the ID mask 11. Alternatively, the filter element 42, 43, 44 may also be such that only one ID identifier value 12 must be entered to carry out filtering.

In the filter elements 42, 43, 44 of the filter bank 41, the stored CAN identifiers of the full CAN controller and the received CAN identifiers are now compared. If correspondence is determined, the corresponding CAN frame is stored in the storage element 45 of the RX filter device 40 and an interrupt IDS-IRQ 32 is generated and is forwarded to the host computer via the host control interface 6. If configured accordingly, the CAN controller can additionally initiate the generation and transmission of an error frame. In other words, if a received CAN frame is stored in the storage element 45 of the RX filter device, this CAN frame has been detected as an attack since use was made of a CAN identifier which is reserved for the full CAN controller on the transmission side. The CAN frame used for the attack can be read out for forensic purposes with the aid of the content from the storage element 45.

Figure 6:
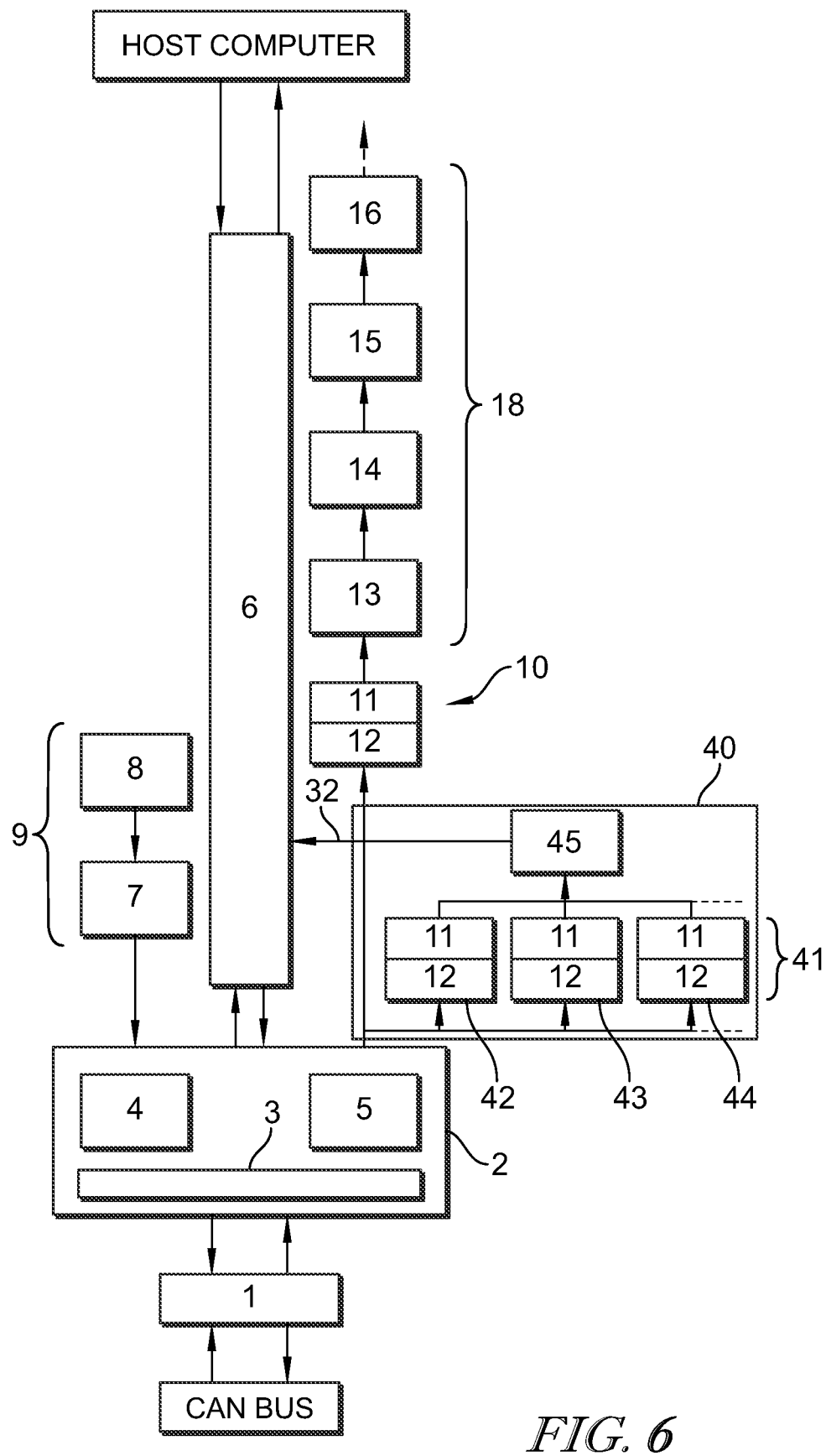
FIG. 6 shows a basic CAN controller having a filter device for intrusion detection.

FIG. 6 shows a basic CAN controller corresponding to that in FIG. 1, in which intrusion detection is implemented by a separate RX filter device 40. In this case, the RX filter device 40 corresponds to that in FIG. 5, with the result that reference is made to the corresponding description of FIG. 5 for a detailed explanation of the method of operation. The CAN identifiers intended for the basic CAN controller for transmission are stored in the filter elements 42, 43, 44 of the filter bank 41 and are compared with the CAN identifiers of the received CAN frames. In the event of correspondence, an attack or an intrusion is therefore present and an interrupt IDS-IRQ 32 is generated after the determined CAN frame has been stored in the storage element 45.

LIST OF REFERENCE SIGNS

1 CAN transceiver
2 CAN protocol engine
3 Control logic unit
4 Bitstream encoder
5 Bitstream decoder
6 Host control interface
7 CAN frame storage area
8 CAN frame storage area
9 TX message buffer/TX-FIFO
10 Filter device
11 ID mask area
12 ID identifier area
13 CAN frame storage element
14 CAN frame storage element
15 CAN frame storage element
16 CAN frame storage element
18 RX message buffer/RX-FIFO
20 TX message buffer/TX-FIFO
21 CAN frame storage element
22 CAN frame storage element
23 CAN frame storage element
24 CAN frame storage element
25 Priority selector
26 RX message buffer/RX-FIFO
27 CAN filter storage element
28 CAN filter storage element
29 CAN filter storage element
30 CAN filter storage element
31 IDS-IRQ
40 RX filter device
41 Filter bank
42 Filter element
43 Filter element
44 Filter element
45 Storage element

The invention claimed is:

1. A basic Controller Area Network (CAN) controller comprising:
a CAN transceiver for connecting the basic CAN controller to a CAN bus;
a CAN protocol engine for coding CAN frames into bitstreams to be sent for transmission on the CAN bus and for decoding received bitstreams from the CAN bus into CAN frames;
a transmission storage area (TX-FIFO) for storing the CAN frames to be transmitted;
a receiving storage area (RX-FIFO) for temporarily storing the received CAN frames before transmission to a host computer, wherein a filter element is arranged between the CAN protocol engine and the RX-FIFO and filters the received CAN frames intended for the basic CAN controller and forwards permissible received CAN frames to the RX-FIFO;
a host control interface for communicating control information between the CAN protocol engine and the host computer; and
a separate receiving (RX) filter device, separate from the RX-FIFO, configured to implement intrusion detection and tap off the received CAN frames immediately downstream of the CAN protocol engine and immediately after reception, the separate RX filter device comprising a filter bank having a plurality of filter elements, wherein the separate RX filter device which, based on CAN identifiers which are assigned to the basic CAN controller for transmitting the CAN frames and are specific to the basic CAN controller, checks whether received CAN frames have a CAN identifier which is identical to one of the CAN identifiers specific to the basic CAN controller and, in response to correspondence, triggers an intrusion detection interrupt request (IDS-IRQ) to the host control interface.

2. A full Controller Area Network (CAN) controller comprising:
a CAN transceiver for connecting the full CAN controller to a CAN bus;
a CAN protocol engine for coding CAN frames into bitstreams to be sent for transmission on the CAN bus and for decoding received bitstreams from the CAN bus into CAN frames;
a transmission storage area (TX-FIFO) for storing the CAN frames to be transmitted;
a priority selector for transmitting a CAN frame to be transmitted to the CAN protocol engine as a function of the priority;
a receiving storage area (RX-FIFO) for temporarily storing the received CAN frames before transmission to a host computer, wherein the RX-FIFO has a multiplicity of CAN filter storage elements, and each CAN filter storage element has a filter element for filtering permissible received CAN frames intended for the full CAN controller from the received CAN frames and for storing a permissible received CAN frame in a CAN frame storage element;
a host control interface for communicating control information between the CAN protocol engine and the host computer; and
a separate receiving (RX) filter device, separate from the RX-FIFO, configured to implement intrusion detection and tap off the received CAN frames immediately downstream of the CAN protocol engine and immediately after reception, the separate RX filter device comprising a filter bank having a plurality of filter elements, wherein the separate RX filter device which, based on CAN identifiers which are assigned to the full CAN controller for transmitting the CAN frames and are specific to the full CAN controller, checks whether the received CAN frame has a CAN identifier which is identical to one of the CAN identifiers specific to the full CAN controller and, in response to correspondence, triggers an intrusion detection interrupt request (IDS-IRQ) to the host control interface.

3. The basic CAN controller of claim 1, wherein the RX filter device filter elements check the received CAN frames to determine whether its CAN identifiers correspond to one of the CAN identifiers which are specific to the CAN controller and are intended for transmission, and a storage element for storing the received CAN frames, the CAN identifiers of which corresponds to a CAN identifier specific to the CAN controller.

4. A method of using a full Controller Area Network (CAN) controller to detect manipulations in a CAN network, the full CAN controller comprising:
   a CAN transceiver for connecting the full CAN controller to a CAN bus;
   a CAN protocol engine for coding CAN frames into bitstreams for transmission on the CAN bus and for decoding received bitstreams from the CAN bus into the CAN frames;
   a transmission storage area (TX-FIFO) for storing the CAN frames to be transmitted;
   a priority selector for transmitting the CAN frames to be transmitted to the CAN protocol engine as a function of the priority;
   a receiving storage area (RX-FIFO) for temporarily storing the received CAN frames before transmission to a host computer, wherein the RX-FIFO has a multiplicity of CAN filter storage elements, and each CAN filter storage element has a filter element for filtering a permissible CAN frames intended for the full CAN controller from the received CAN frames and for storing the permissible CAN frames in a CAN frame storage element;
   a host control interface for communicating control information between the CAN protocol engine and the host computer; and
   a separate receiving (RX) filter device, separate from the RX-FIFO, having a filter bank having a plurality of filter elements,
   the method comprising:
   implementing, by the separate RX filter device, intrusion detection and tapping off the received CAN frames immediately downstream of the CAN protocol engine and immediately after reception,
   occupying, within the filter elements of a subset of the CAN filter storage element of the RX-FIFO, the CAN identifiers specific to the full CAN controller for transmitting a CAN frame, thereby resulting in the CAN identifiers of the received CAN frames being checked with the CAN identifiers specific to the full CAN controller in the respective filter elements and the received CAN identifier being stored in the corresponding CAN frame storage element in response to a received CAN identifier corresponding to one of the specific CAN identifiers of the full CAN controller and an intrusion detection interrupt request IDS-IRQ to the host control interface is generated.

5. A method of using a full Controller Area Network (CAN) controller to detect manipulations in a CAN network, the full-CAN controller comprising:
   a CAN transceiver for connecting the full CAN controller to a CAN bus;
   a CAN protocol engine for coding CAN frames into bitstreams to be transmitted for transmission on the CAN bus and for decoding received bitstreams from the CAN bus into the CAN frames;
   a transmission storage area (TX-FIFO) having a multiplicity of CAN frame storage elements for storing the CAN frames to be transmitted;
   a priority selector for transmitting the CAN frames to be transmitted to the CAN protocol engine as a function of the priority;
   a receiving storage area (RX-FIFO) for temporarily storing the received CAN frames before transmission to a host computer, wherein the RX-FIFO has a multiplicity of CAN filter storage elements and each CAN filter storage element has a filter element for filtering permissible CAN frames intended for the full CAN controller from the received CAN frames and for storing a permissible CAN frame in a CAN frame storage element; and
   a host control interface for communicating control information between the CAN protocol engine and the host computer; and
   a separate receiving (RX) filter device, separate from the RX-FIFO, having a filter bank having a plurality of filter elements,
   the method comprising:
   supplying, by the separate RX filter device, the received CAN frames to the CAN frame storage elements of the RX-FIFO at the reception time; and
   comparing the received CAN frames for correspondence between the CAN identifier of the received CAN frame and the CAN identifiers which are present in the CAN frame storage elements and are intended for transmission; and
   generating in response to correspondence, an intrusion detection interrupt request IDS-IRQ to the host control interface.

6. The full CAN controller of claim 2, wherein the filter elements check a received CAN frame to determine whether its CAN identifiers correspond to one of the CAN identifiers which are specific to the CAN controller and are intended for transmission; and
   a storage element for storing a received CAN frame, the CAN identifiers of which correspond to a CAN identifier specific to the CAN controller.

* * * * *